United States Patent [19]
Ross

[11] Patent Number: 5,280,346
[45] Date of Patent: Jan. 18, 1994

[54] EQUALIZING AMPLIFIER

[76] Inventor: John D. Ross, 42 Elizabeth Dr., Iroquois, Ontario, Canada, K0E 1K0

[21] Appl. No.: 964,606

[22] Filed: Oct. 23, 1992

[51] Int. Cl.⁵ .......................................... H04N 5/205
[52] U.S. Cl. ...................................... 358/38; 358/904; 358/176; 358/184; 330/304; 330/294; 333/28 R
[58] Field of Search ............ 333/28 R; 330/304, 302, 330/294; 360/65; 358/21 R, 27, 35, 38, 904, 174, 176, 19, 184; H04N 5/205

[56]  References Cited
U.S. PATENT DOCUMENTS

| | | |
|---|---|---|
| 3,383,616 | 5/1968 | Friend et al. . |
| 3,456,206 | 7/1969 | Kwartiroff et al. . |
| 3,781,703 | 12/1973 | Duty . |
| 3,944,943 | 3/1976 | Reed . |
| 4,007,340 | 2/1977 | Russell . |
| 4,122,417 | 10/1978 | Takasaki et al. . |
| 4,158,820 | 6/1979 | Stanley . |
| 4,187,479 | 2/1980 | Ishizuka et al. . |
| 4,204,176 | 5/1980 | Takasaki et al. ................ 333/28 R |
| 4,210,874 | 7/1980 | Moskowitz . |
| 4,275,358 | 6/1981 | Winget . |
| 4,378,535 | 3/1983 | Chiu et al. . |
| 4,506,237 | 3/1985 | Matzek . |
| 4,633,200 | 12/1986 | Adler ................ 330/304 X |
| 4,746,881 | 5/1988 | Suzuki et al. ................ 330/304 X |
| 4,755,771 | 7/1988 | Sakaida et al. . |
| 4,862,103 | 8/1989 | Funada ................ 333/28 R X |
| 4,996,497 | 2/1991 | Waehner . |
| 5,115,213 | 5/1992 | Eguchi ................ 333/28 R X |
| 5,144,267 | 9/1992 | West, Jr. ................ 333/28 R |

Primary Examiner—Mark R. Powell
Attorney, Agent, or Firm—Sixbey, Friedman, Leedom & Ferguson

[57] ABSTRACT

Equalizing amplifying circuitry for compensating frequency dependent losses occurring in a signal transmitted over a network such as a cable. The circuitry includes an equalizing network responsive to the signal transmitted over the cable, the equalizing circuitry having a predetermined frequency response characteristic. The output signal from the equalizing network is applied to an amplifier and an attenuator applies a portion of the amplifier output as a positive feedback signal to frequency response characteristic modifying circuitry to vary the amount of current passing through the equalizing circuitry as a function of the amplitude of the positive feedback signal to thereby effectively modify the frequency response characteristic of the equalizing circuitry. Summing circuitry responsive to the signal transmitted over the network and to the output signal from the amplifier provides a corrected signal in which the frequency dependent losses introduced by the network are compensated for with a single control.

42 Claims, 7 Drawing Sheets

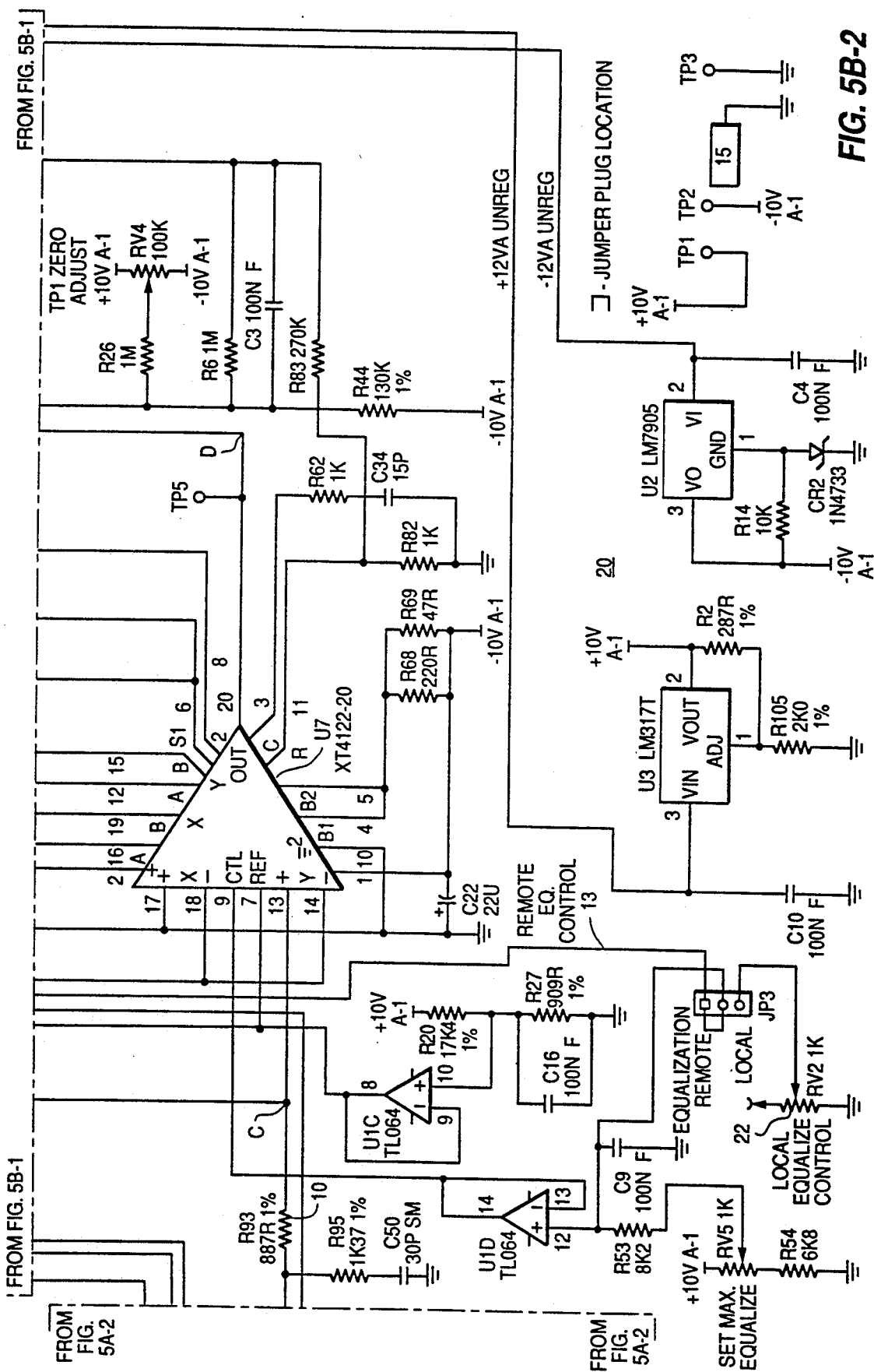

EQUALIZING AMPLIFIER

FIELD OF THE INVENTION

This invention relates to equalizing amplifiers and, in particular, to such amplifiers that are used to restore a substantially flat, for example, overall frequency response with respect to signals that have been transmitted through frequency dependent networks including transmission lines, etc.

BACKGROUND OF THE INVENTION

Although the present invention is hereafter described with respect to video equalizing amplifiers for compensating losses associated with coaxial cable used by the professional television industry, it is to be understood that the invention can be applied to any situation involving the transmission of any type of signal over any type of frequency dependent network where it is desired to restore a corrected (typically flat) overall frequency response.

Analogue TV signals are distributed in a system via coaxial cables. Such cables have a signal loss characteristic which is frequency-dependent, with the loss at the higher video frequencies (e.g. 5 MHz) being much greater than the loss at low frequencies (e.g. below 100 KHz). When the length of such cables exceeds 30 feet, the effect of relatively greater attenuation of the higher frequencies may become objectionable because of the loss of picture detail and color saturation. The loss of color occurs because the NTSC color system employs the encoding of color information onto a 3.58 MHz subcarrier (4.43 MHz in the PAL system) and saturation is in proportion to modulation amplitude.

It is common practice to employ equalizing amplifiers to compensate for such cable losses. The adjustment of such prior-art amplifiers to match a particular cable length is a complex procedure. It normally involves several adjustments, each of which apply primarily to a different part of the frequency spectrum but which typically interact. To accomplish precise equalization requires the availability and use of frequency sweep generators and associated measuring equipment. This procedure is further complicated by the distance between the ends of the cable, which represent the generator and measuring equipment locations. In general, the procedure is quite difficult and only the largest and best installations have the necessary equipment to do this properly.

An amplifier which can equalize a given fixed length of cable is shown in FIG. 1. In this example, the equalizing network 2 provides high frequency slope adjustment and comprises a complex multi-section design with a separate adjustment of the higher frequencies and perhaps midfrequency adjustments as well. The amplifier 5 has a flat response and adjustable gain (the gain may be set to zero). The resultant correction signal, which is obtained by appropriately setting the gain of amplifier 3, is added to the incoming signal via summing circuit 4 to provide an output with corrected (flat) frequency response.

At first, it may seem that, once the equalizing network 2 is calibrated, various lengths of cable may be accommodated by appropriately setting the variable gain amplifier 3, but this is not so. Consider the case where amplifier 3 and network 2 have been calibrated for 500 feet of cable. If the cable length is increased to 1000 feet, it might seem that if the gain of amplifier 3 were doubled, the cable compensation would be correct. In fact, the high-frequency compensation would not be sufficient.

If, for example, for 500 feet of cable, the amount of 100 KHz signal passed is 95% and the amount of 10 MHz signal is 70%, then it follows that for the 1000 feet cable, the output would at 100 KHz be 90.25% (0.95×0.95) and at 10 MHz would be 49% (0.7×0.7). Thus, as the cable length is increased, the input to the filter network 3 becomes deficient in high frequencies; therefore, the filter shape must change in order to meet the larger demand for high frequency correction. Obviously, a constant filter response will not work for both cases. There is a cascading effect which requires a different equalizing network for the longer cable. This is the reason for the multiple adjustments in the prior-art amplifiers.

SUMMARY OF THE INVENTION

It is thus a primary object of this invention to provide an equalizing amplifier which exhibits substantial improvements in ease of use and accuracy of equalization.

It is a further object to provide such an amplifier for use in the equalization of losses associated with the coaxial cable used by the professional television industry.

It is a further object of this invention to provide a single-control equalizer having a network designed to exhibit a compounding effect versus the amount of correction required.

The foregoing objects may be implemented by an amplifying and equalizing means in which the setting of only a single control is able to compensate for the frequency-dependent loss of the transmission cable.

A further object of this invention is to provide an improved equalizing amplifier wherein the correction of the cable loss at any one frequency will cause the entire frequency response to be flat, for example. This is readily accomplished without special test equipment (the sweep generators of the prior art, for example) by feeding the cable with a correct normal color signal and observing the amplifier output at the cable receiving end. For example, if the color burst amplitude (or some other indicator of high frequency loss, for example) has been diminished by the cable loss, the equalizer can be adjusted to restore it. At this point, not only will the signal be correct, but the frequency response over the entire spectrum will also be flat.

These and other objects will become apparent after a reading of the specification and claims taken together with the drawing.

BRIEF DESCRIPTION OF THE DRAWINGS

FIGS. 5A1, 5A2, 5B1 and 5B2, taken together, constitute a schematic diagram of the circuitry of FIG. 4.

DETAILED DESCRIPTION OF PREFERRED EMBODIMENTS OF THE INVENTION

Figure 1:
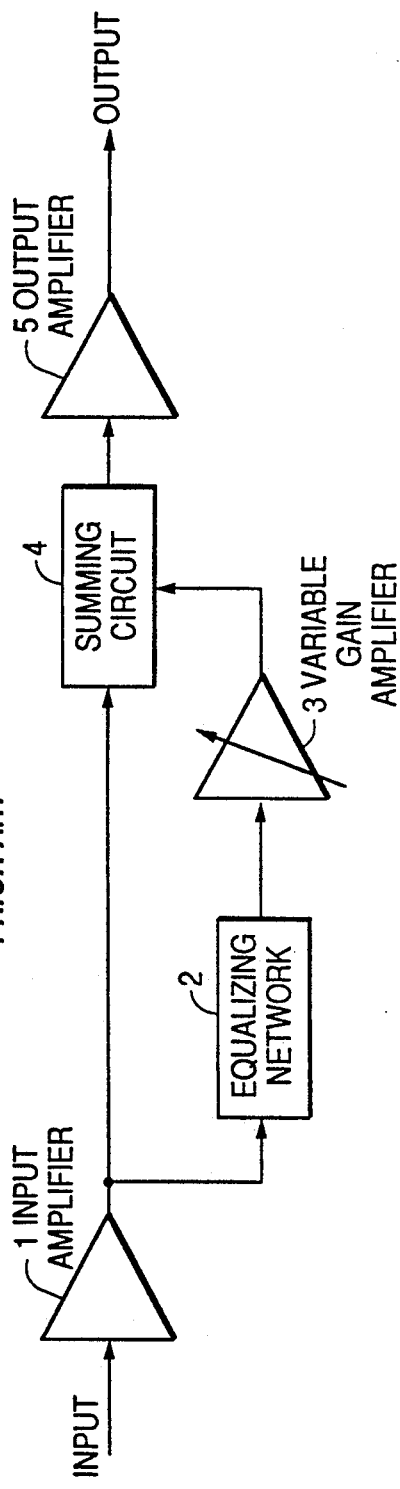
FIG. 1 is a block diagram an equalizing amplifier which illustrates problems associated with prior art equalizers.
Figure 2:
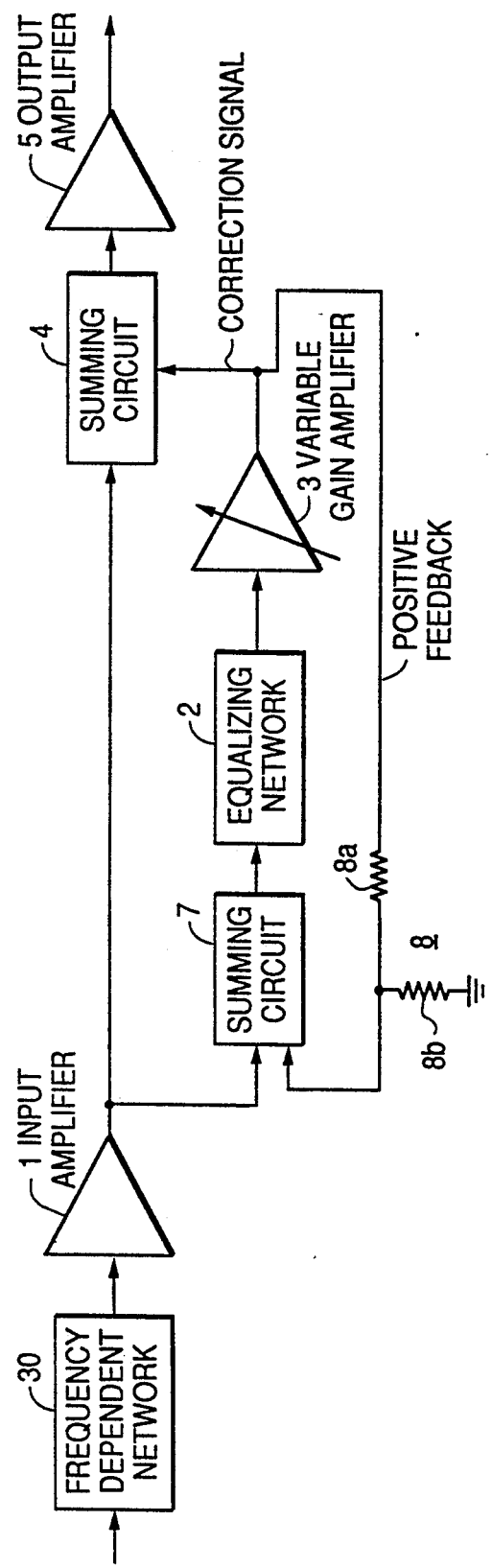
FIG. 2 is a block diagram of an illustrative equalizing amplifier in accordance with the invention.

Referring to FIG. 2, an equalizing amplifier in accordance with a first embodiment of the invention is illustrated wherein the input signal from a frequency dependent network 30 such as cable to be equalized is applied to an input amplifier 1. The output of the amplifier is applied to a summing circuit or node 4 in a first branch and a summing node 7 in a second branch. The output of summing node 7 is applied to an equalizing circuit means or network 2 where equalizing network is frequency dependent such that the impedance thereof typically decreases with increasing frequency. The output of the equalizing network is applied to a variable gain amplifier 3. The output of the variable gain amplifier is applied to summing node 4 and, as positive feedback, to summing node 7 via an attenuator 8, comprising potential dividing resistors 8a and 8b, where the employment of the positive feedback is an important characterizing feature of the invention. The correction signal applied to summing node 4 from the output of variable gain amplifier 3 is summed with the output from amplifier 1 in summing node 4, the output of the summing node being applied to amplifier 5 which preferably has a flat response and adjustable gain where the gain may be set to zero.

In operation, as the gain of amplifier 3 is increased, additional high frequency energy is applied to network 2 due to the positive feedback. This results in a high-frequency boost at the input of amplifier 3, thus effectively changing the shape of the response curve of network 2. The amount of attenuation introduced by attenuator 8 is such together with the design of equalizing network 2 as to give a flat response for the type of cable and range of cable length desired, for example, 0 ft. to 1000 ft. of type 8281 (Amphenol, Inc.) cable. Too much attenuation and there will not be enough HF boost, too little and there will be excessive HF boost or oscillation.

Hence, it can be seen that with the employment of the positive feedback from the input of amplifier 3 to summing node 7, a substantial improvement in ease of use and accuracy of equalization is achieved where the equalization can be simply effected by adjusting the gain of variable gain amplifier 3 to thereby adjust the amount of positive feedback, this adjustment being effected by a single control connected either locally or remotely to the variable gain amplifier.

Figure 3:
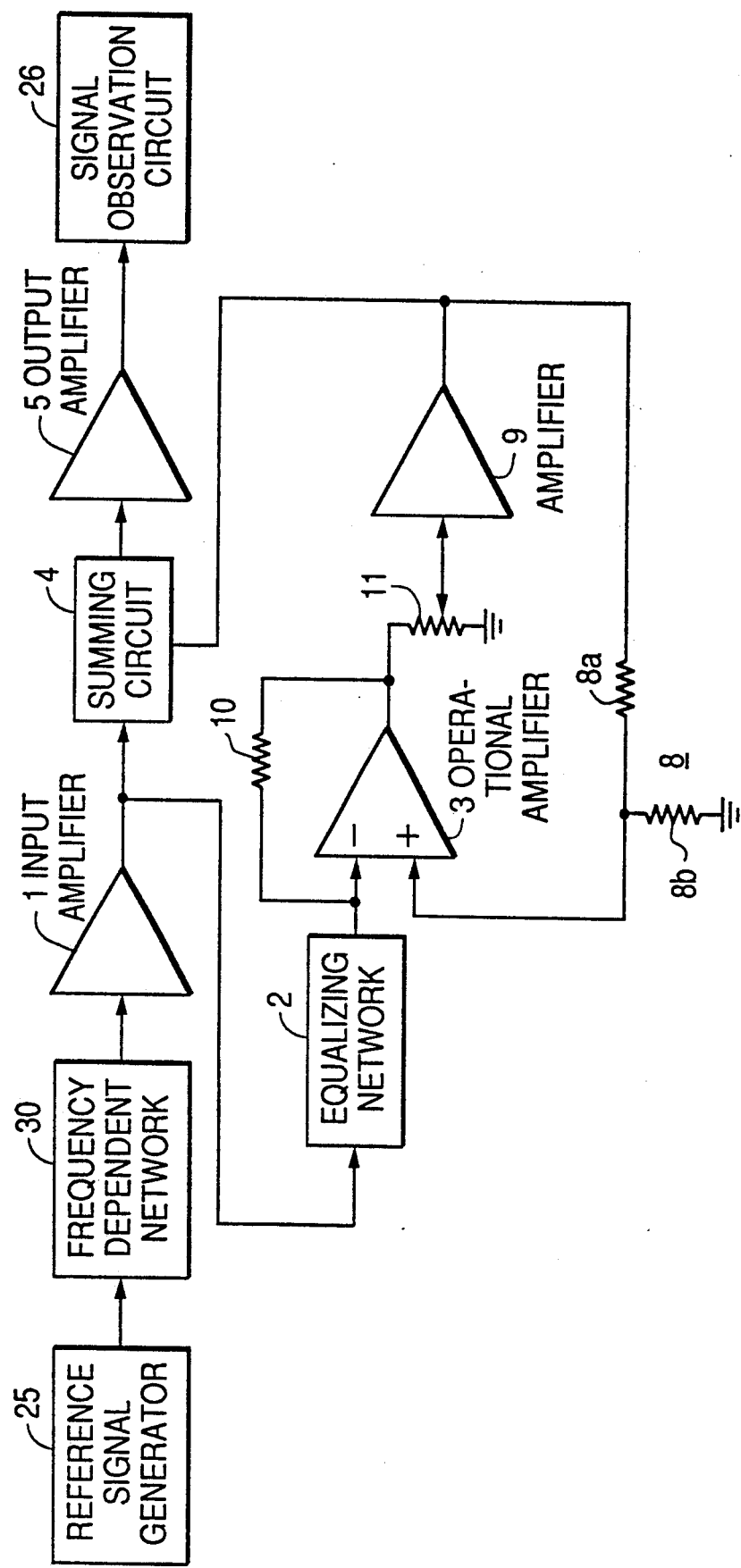
FIG. 3 is a block diagram of a further illustrative equalizing amplifier in accordance with the invention.

FIG. 3 is a block diagram of a further illustrative embodiment of the invention wherein the input signal from the cable is applied to amplifier 1 and the output of the amplifier is applied to summing node 4 and equalization filter network 2. The output of equalization network 2 is applied to the negative terminal of an operational amplifier 3 having a feedback resistor 10 also connected to the negative input thereof. The output of the amplifier 3 is connected to a potentiometer 11, the output of the potentiometer being connected to an amplifier 9. The output of amplifier 9 is connected as a correction signal to summing node 4 and as a positive feedback signal to the positive input terminal of amplifier 3 via attenuator 8. The output of the summing node 4 is applied to an amplifier 5.

In operation, when potentiometer 10 is set near minimum output very little energy is feed back to amplifier 3. Thus, the amplifier functions as a normal op-amp with gain at a particular frequency primarily dependent on ratio of the value of resistor 10 to the value of the series impedance of network 2 whereby the gain of the op-amp increases with increasing frequency since the impedance of network 2 decreases with increasing frequency. When potentiometer 11 is set toward maximum output, the feedback caused by resister 10 causes the same signal to appear at the negative terminal. This in turn causes the current through network 2 to increase, especially at higher frequencies and thus the output of amplifier 3 similarly increases. In essence, the filter network 2 is being used twice, once in response to the cable signal from amplifier 1 and once in response to the positive feedback signal.

It should be noted with respect to the FIG. 2 embodiment that filter network 3 is also effectively used twice, once in response to the cable signal and once in response to the positive feedback signal applied to summing node 7.

As will be described in further detail with respect to FIGS. 4 and 5A and 5B, the equalizing amplifier of the present invention is preferably remotely controlled although it is to be understood that the equalizing amplifier may also be locally controlled. It should be noted that remote control of the equalization function would not be practical if more than one frequency response function were controlled. The amplifier is typically used in connection with a remote broadcast truck (football, baseball games, etc.) to receive external signals over various lengths of cable (remote cameras, feeds from other trucks, etc.) where every broadcast situation will be different. Hence, the easily adapted amplifier in accordance with the present invention is particularly advantageous in that there is not time to use elaborate methods to correctly flatten the frequency response.

Figure 4:
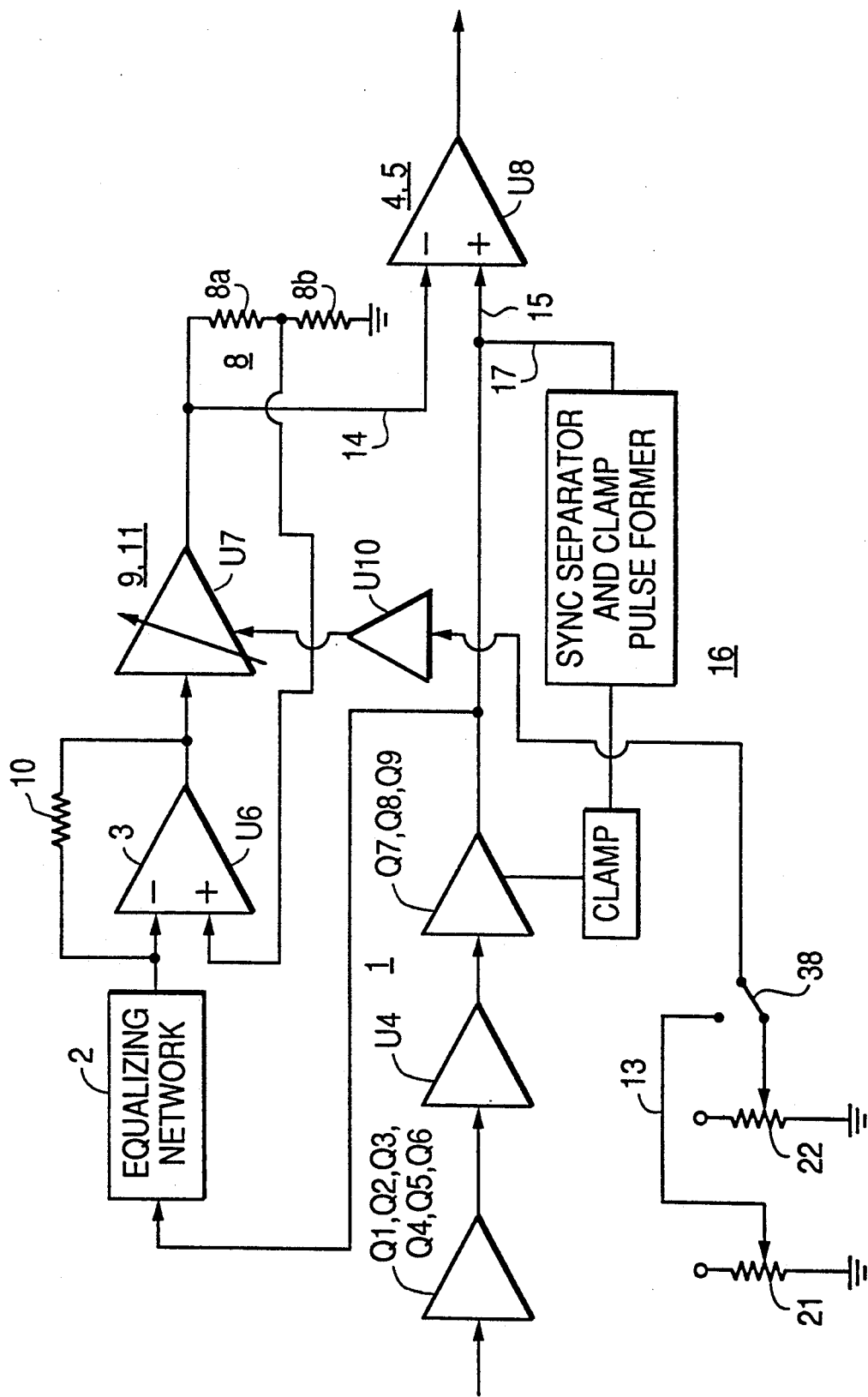
FIG. 4 is a modified block diagram of the equalizing amplifier of FIG. 3 including further circuitry associated therewith.
Figures 1, 5A:
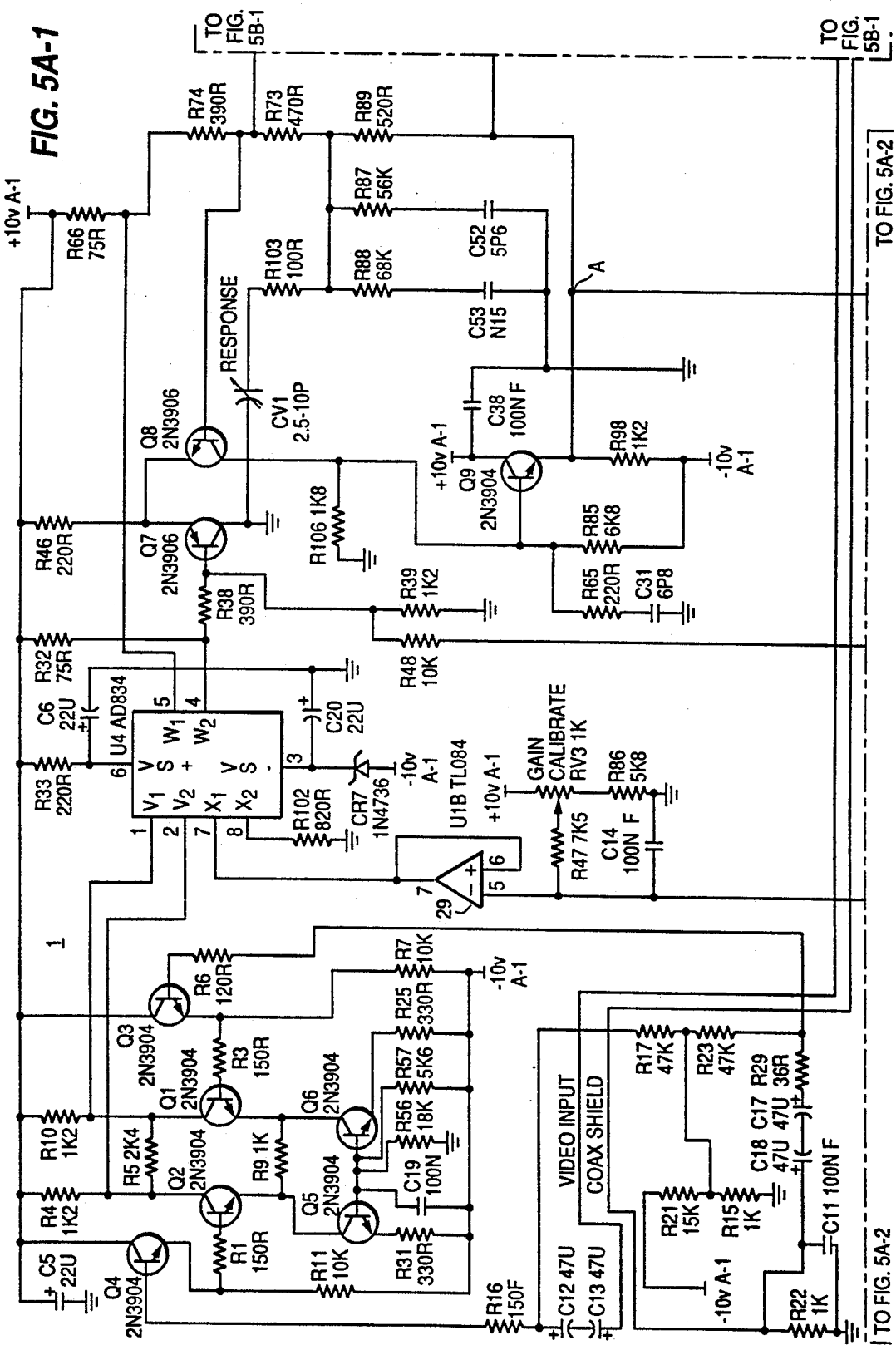
Figures 2, 5A:
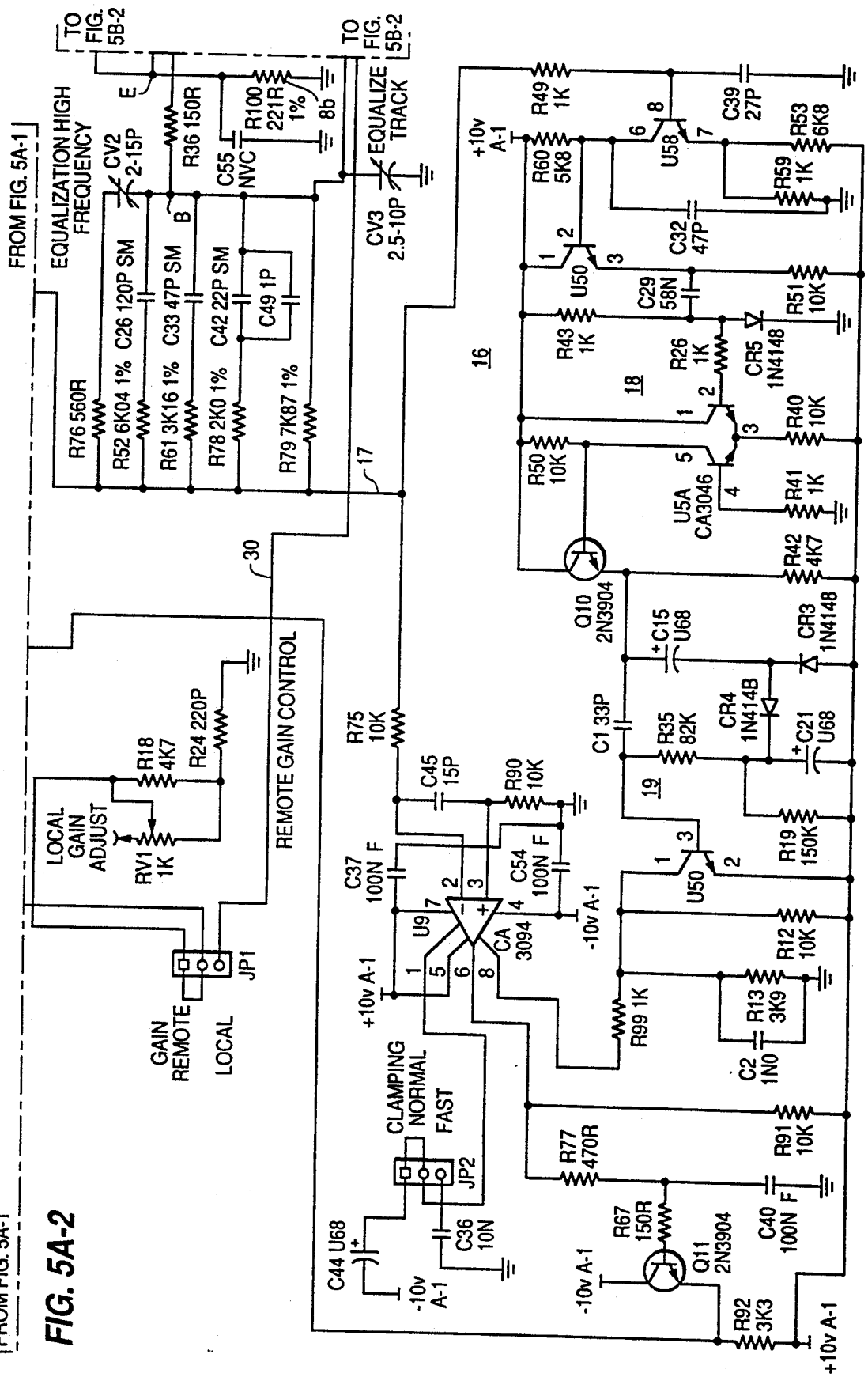
Figures 1, 5B:
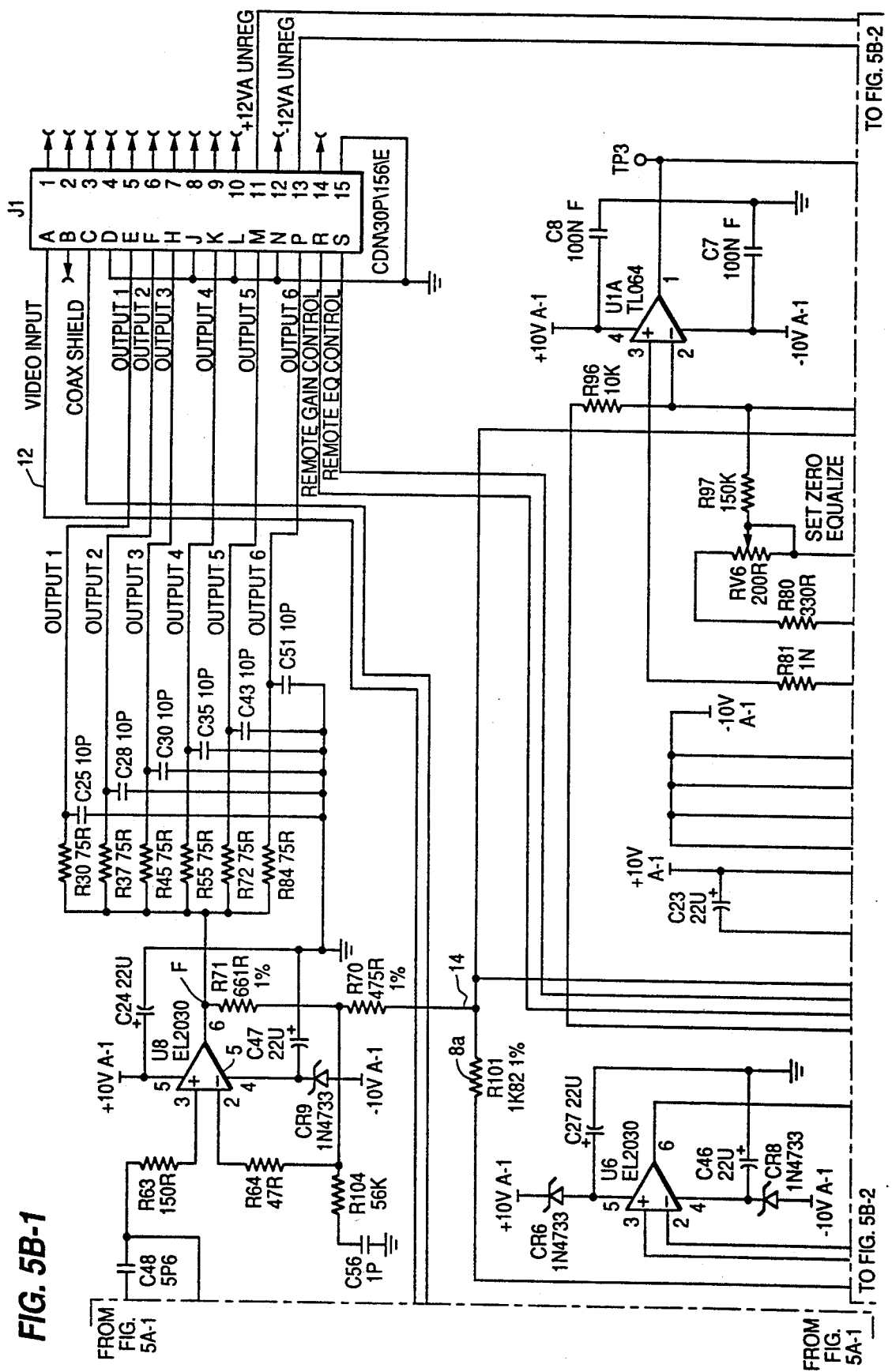

Referring now to FIGS. 4, 5A and 5B, there is illustrated in further detail an equalizing amplifier in accordance with the present invention where the circuitry includes circuits concerned with sync separation, video clamping and remote control of gain and equalization. Although some of the foregoing circuits are not required for the equalization of signals in general, they will be generally described hereinafter in connection with a preferred embodiment for the equalization of coaxial cable typically used by the professional television industries in applications such as those described above where for example the amplifiers are used in connection with a remote broadcast truck. In particular, the circuitry of FIGS. 4, 5A, and 5B is designed for use with 8182 (Amphenol) type cable, the length of which may vary from 0 ft. to 1000 ft.

The following description simultaneously refers to both FIG. 4 and FIGS. 5A and 5B where the relationship between the elements described hereinbefore with respect to FIG. 3 are generally indicated in FIGS. 4, 5A, and 5B and are listed below together with equivalent elements in FIGS. 5A and 5B. Moreover, in FIG. 4 the substantially equivalent elements of FIGS. 3, 5A and 5B are generally indicated thereon.

| FIG. 3 | FIGS. 5A AND 5B |
| --- | --- |
| Network 2 | R76, 52, 61, 78, 79 |
| | CV2, C26, 33, 42, 49 |
| Amplifier 3 | U6 (EL2030) |
| Pot 11, Amp 9 | U7 (XT-4122-20) |
| | Remote Controlled Amplifier |
| Summing Node 4 | R70, 64 and U8. |
| Amplifier 5 | U8 (EL2030) |
| Resistor 10 | R93 (below U6) |

| FIG. 3 | FIGS. 5A AND 5B |
|---|---|
| Attenuator 8 | R100, 101 |

The block diagram of FIG. 4 indicates the interconnection of the main functional areas. FIG. 4 may be referred to along with the schematic diagram of FIGS. 5A and 5B which provides further details when read with the following description.

Illustrative values of various components are given in FIGS. 5A and 5B, it being understood these values are for purposes of illustration, there being no intent to be limited to these values. Moreover, the elements U3; U2; U1; (U8, U6) (EL2030 Amplifier); U5; U9; and U7 are commercially available from and respectively correspond to Part Numbers 500-103; 500-020; 500-034; 500-102; 501-001; 501-023; and 504-064 of Ross Video Limited, Iroquois, Ontario, Canada.

The video input signal is capacitively coupled to input stage emitter followers Q3 and Q4 of input amplifier 1. These feed a differential amplifier (Q1 and Q2) which provides good rejection of common mode hum. The push-pull signal from the collectors of Q3 and Q4 is applied to the inputs of U4, a remote controlled gain stage. U1B buffers the control voltage for U4, as will be further described below. The push-pull outputs of U4 are in current form and produce small signals across R32 and R66. These signals are amplified by Q7 and Q8 and drive emitter follower Q9.

The signal at the Q9 emitter should preferably have its back porch set to ground level for the amplifier circuits to function properly. To achieve this, a sync separator, clamp pulse former and feedback clamp are used, the foregoing elements being generally designated at 16. The signal from Q9 emitter is applied over line 17 and amplified with a gain of about 5 and inverted by U5B. It is then coupled to pin 2 of U5A, which functions as a slicer as generally indicated at 18 to separate the sync. The sync waveform appears at pin 6 of U5A. C1, R35 and U5D, as indicated at 19, generate a clamp pulse timed to sample the back porch. This pulse turns amplifier U9 on, causing it to make a comparison between the signal and ground level during the back porch. A correction signal is fed via Q11 to Q7 of input amplifier 1, thus stabilizing the back porch level.

The signal from Q9 of input amplifier 1 also passes through equalization network 2 and then to amplifier U6, which corresponds to amplifier 3 of FIG. 3. As discussed above, the output signal from U6 has a frequency response characteristic designed to replace the cable attenuation of the video signal. In this regard, reference may also be made to U.S. Pat. No. 4,996,497 which is incorporated herein by reference. The output signal from U6 is applied to remote control gain stage U7, where the correct amount of cable equalization may be set. As will be further described below, potentiometer 11 and amplifier 9 of FIG. 3 are replaced with amplifier U7 of FIG. 5B and an equalization control signal is provided via either local potentiometer 22 or remote potentiometer 21 (FIG. 4). A portion of the output signal is positively fed back via potential divider 8 to the positive input of U6 as described hereinbefore to provide the requisite equalization in accordance with the invention.

A further feature of the invention is that the setting of potentiometer 22 (or potentiometer 21) required to equalize a given length of cable varies substantially linearly with respect to the length of cable to be equalized where with the potentiometer set toward minimum output, the length of cable is small. With the potentiometer set at maximum output, 1000 feet of cable is equalized and with the potentiometer set half-way, substantially 500 feet of cable is equalized, etc.

U1A stabilizes equalization control span by providing temperature compensation of U7 over the 0-1000 feet cable range. U1C buffers a control reference voltage which is substantially equal to about the one-half setting of potentiometer 22 (or 21). U1D buffers the control signal from potentiometer 21 (or 22). Potentiometer RV6 sets the sensitivity of the control signal applied from U1D. Circuits U2 and U3 generally indicated at 20 in FIG. 5B provide power regulation for the amplifier.

The direct signal from Q9 of input amplifier 1 and the equalization correction signal from U7 are combined in output driving amplifier U8, which feeds six, for example, outputs.

To further illustrate the correspondence between FIG. 3 and FIGS. 5A and 5B, note the output from input amplifier 1 of FIG. 3 occurs at point A in FIG. 5A; the output of equalization network 2 occurs at point B; the output of op-amp 3 occurs at point C; the output of remote controlled amplifier U7 at point D; the output of attenuator 8 at point E; and the output of summing node 4 and amplifier 5 at point F. Thus, the video signal occurring on line 12 of FIG. 5B, which is received from the cable to be equalized, is applied to emitter followers Q3 and Q4 of amplifier 1 as indicated in FIG. 5A. The output of amplifier 1 occuring at point A is applied to equalization network generally indicated at 2 in FIG. 5A. The output of the equalization network occurring at point B is applied to the negative input terminal of operational amplifier 3 where the output of the amplifier is also applied to the negative input terminal via resistor 10. The output of amplifier 3 is applied to remote controlled amplifier U7. A portion of the output signal from amplifier U7 is applied as positive feedback to the positive terminal of amplifier 3 via the attenuator designated at 8 and comprising resistors 8a and 8b. Potentiometer 22 provides local equalization control, the output of potentiometer 22 being applied through buffer U1D to amplifier U7 to control the amount of positive feedback to amplifier 3. Remote control of the equalization is available from line 13 (FIGS. 4 and 5B) and potentiometer 21 (FIG. 4) and is also applied to amplifier U7 via buffer U1D. A switch 38 is illustrated in FIG. 4 to select the local or remote equalization although any known means may be employed to effect this selection. The correction signal obtained from the output of amplifier U7 is applied over line 14 to the negative terminal of amplifier 5 while the output from amplifier 1 is applied to the positive terminal thereof via line 15.

Referring to FIG. 5A, additional components CV3, R95 and C50 are preferred to trim the response at longer cable lengths to thus effectively remove what may be second-order effects.

It has been assumed throughout that the loss characteristic of all samples of a given type of cable are sufficiently similar for a predetermined signal type and this in practice for professional grades of cable has been found to be the case.

Thus, in accordance with the present invention, an equalizing amplifier has been described wherein the correction of cable loss at any one frequency will cause the entire frequency response to be flat, for example. In particular, with the amplifier of FIGS. 5A and 5B, a substantially flat response from 0–12 MHZ is obtained. This is readily accomplished without special test equipment by feeding the cable with a correct normal color signal from a reference signal source 25 as indicated in FIG. 3 where, for example, the amplitude of the back porch will be at the correct level. (Note that if it is known that the amplitude of the back porch, for example, is not at the correct level as transmitted from source 25, the gain of U4 (FIG. 5A) may be adjusted by a control signal applied from line 30 via buffer 29 to thus set the back porch at the correct level.) The output from amplifier 5 at the cable receiving end can then be observed with a signal observation device 26 such as an oscilloscope where the peak-to-peak voltage of the back porch can accordingly be observed. Hence, for example, if the color burst amplitude (or some other indicator of high frequency loss, (for example) has been diminished by the cable loss, the equalizer can be adjusted by adjusting the gain of variable gain amplifier 3 of FIG. 2 or amplifier U7 of FIG. 5A to restore the loss. At this point, not only will the signal output at amplifier 5 be correct, but the frequency response over the entire spectrum will also be flat.

What is claimed is:

1. Equalizing amplifying circuitry for compensating for at least frequency dependent losses occurring in a signal transmitted over a network, said circuitry comprising:

equalizing circuit means responsive to the signal transmitted over the network, said equalizing circuit means having a predetermined frequency response characteristic which emphasizes at least one frequency component of said signal transmitted over said network with respect to other frequency components of the transmitted signal;

signal amplifying means responsive to the output signal from the equalizing circuit means;

attenuating means for providing a portion of the output signal from the signal amplifying means as a positive feedback signal;

frequency response characteristic modifying means for varying the amount of current passing through the equalizing circuit means at said at least one frequency component of the transmitted signal as a function of the amplitude of said positive feedback signal to thereby effectively modify the frequency response characteristic of the equalizing circuit means so that the output signal from said signal amplifying means is compensated for losses occurring in the signal transmitted over the network at said at least one frequency component of the transmitted signal; and summing means responsive to the signal transmitted over the network and to the output signal from said signal amplifying means for providing a corrected signal in which at least the frequency dependent losses introduced by the network are compensated for.

2. Circuitry as in claim 1 where said signal transmitted over said network is a color television signal.

3. Circuitry as in claim 1 where said one frequency component of the signal transmitted over said network is a color subcarrier upon which color information is encoded.

4. Circuitry as in claim 3 where the color subcarrier frequency is 3.58 MHz.

5. Circuitry as in claim 1 including means for applying a reference signal to said network and means for observing at the output of said summing means an observation signal having a parameter which is related to the magnitude of said component having said one frequency whereby said frequency response characteristic of the equalizing circuit means can be effectively modified by the frequency response characteristic modifying means to adjust said parameter of said observation signal to a predetermined level at which time the frequency dependent losses introduced by the network will be compensated for.

6. Circuitry as in claim 5 where said network is a cable, said reference signal is a predetermined color television signal, said observation signal is the color burst signal of the predetermined color television signal, and said parameter of the observation signal is the magnitude of the color burst signal.

7. Circuitry as in claim 1 where the frequency response is substantially flat at the output of said summing means over the entire spectrum of the signal transmitted over the network.

8. Circuitry as in claim 7 where said frequency response is substantially flat from 0–12 MHz.

9. Circuitry as in claim 1 where said frequency dependent network is a cable whereby said frequency response characteristic of the equalizing circuit means is modified by the frequency response characteristic modifying means in accordance with the length of said cable.

10. Circuitry as in claim 9 where said transmitted over said cable is a color television signal.

11. Circuitry as in claim 10 where said one frequency component of the signal transmitted over said network is a color subcarrier upon which color information is encoded.

12. Circuitry as in claim 11 where the color subcarrier frequency is 3.58 MHz.

13. Circuitry as in claim 1 where said frequency response characteristic modifying means includes operational amplifier means having an impedance connected between the output thereof and the negative input terminal thereof where the negative input terminal thereof is responsive to the output signal from the equalizing circuit means and the positive input terminal thereof is responsive to the positive feedback signal.

14. Circuitry as in claim 13 where said signal amplifying means includes control means for varying the gain thereof and thus vary said amplitude of the positive feedback signal applied to the positive input terminal of the operational amplifier means to thereby vary the amount of said current passing through the equalizing circuit means at at least said one frequency component of the signal transmitted through the network.

15. Circuitry as in claim 14 where said control means for varying the gain of the signal amplifying means is the only control means for providing equalization correction to said corrected signal at the output of said summing means.

16. Circuitry as in claim 14 where said control means for varying the gain of said signal amplifying means includes means for varying said gain at a location remote from the location of the equalizing amplifying circuitry.

17. Circuitry as in claim 14 where said frequency dependent network is a cable whereby said frequency response characteristic of the equalizing circuit means is modified by said means for varying the gain of the signal amplifying means in accordance with the length of said cable.

18. Circuitry as in claim 17 where said control means for varying the gain of the signal amplifying means includes potentiometer means where the setting of the potentiometer means needed to provide said corrected signal at the output of said summing means varies substantially linearly with respect to the length of said cable to be equalized.

19. Circuitry as in claim 14 where said signal transmitted over said cable is a color television signal.

20. Circuitry as in claim 19 where said one frequency component of the signal transmitted over said network is a color subcarrier upon which color information is encoded.

21. Circuitry as in claim 20 where the color subcarrier frequency is 3.58 MHz.

22. Circuitry as in claim 14 including means for applying a reference signal to said network and means for observing at the output of said summing means an observation signal having a parameter which is related to the magnitude of said component having said one frequency the magnitude of said one frequency whereby said frequency response characteristic of the filter circuit means can be modified by the means for varying the gain of the signal amplifying means to adjust said parameter of said observation signal to a predetermined level at which time the frequency dependent losses introduced by the network will be compensated for.

23. Circuitry as in claim 22 where said network is a cable, said reference signal is a cable, said reference signal is a predetermined color television signal, said observation signal is the color signal of the predetermined color television signal and said parameter of the observation signal is the magnitude of the color burst signal.

24. Circuitry as in claim 13 including potentiometer control means connected between said output of the operational amplifier means and to the input of said signal amplifying means so that the amplitude of the positive feedback signal applied to the positive input terminal of the operational amplifier means may be varied to thereby vary the amount of said current passing through the equalizing circuit means at at least said one frequency component of the signal transmitted through the network.

25. Circuitry as in claim 24 where said potentiometer control means is the only control means for providing equalization correction to said corrected signal at the output of said summing means.

26. Circuitry as in claim 24 where said frequency dependent network is a cable whereby said frequency response characteristic of the equalizing circuit means is modified by said potentiometer means in accordance with the length of said cable.

27. Circuitry as in claim 26 where the setting of the potentiometer means needed to provide said corrected signal at the output of said summing means varies substantially linearly with respect to the length of said cable to be equalized.

28. Circuitry as in claim 24 where said signal transmitted over said network is a color television signal.

29. Circuitry as in claim 28 where said one frequency component of the signal transmitted over said network is a color subcarrier upon which color information is encoded.

30. Circuitry as in claim 29 where the color subcarrier frequency is 3.58 MHz.

31. Circuitry as in claim 13 where said impedance connected between the output of the operational amplifier means and the negative input terminal thereof is resistive.

32. Circuitry as in claim 1 where said frequency response characteristic modifying means includes further summing means responsive to the signal transmitted over the network and the positive feedback signal, the output of said further summing means being applied to said equalizing circuit means.

33. Circuitry as in claim 32 where said signal amplifying means includes control means for varying the gain thereof and thus said amplitude of said positive feedback signal to thereby vary the amount of said current passing through the equalizing circuit means at at least said one frequency component of the signal transmitted through the network.

34. Circuitry as in claim 33 where said control means for varying the gain of the signal amplifying means is the only control means for providing equalization correction to said corrected signal at the output of said summing means.

35. Circuitry as in claim 33 where said means for varying the gain of said signal amplifying means includes means for varying said gain at a location remote from the location of the equalizing amplifying circuitry.

36. Circuitry as in claim 33 where said frequency dependent network is a cable whereby said frequency response characteristic of the filter circuit means is modified by said means for varying the gain of the signal amplifying means in accordance with the length of said cable.

37. Circuitry as in claim 36 where said control means for varying the gain of the signal amplifying means includes potentiometer means where the setting of the potentiometer means needed to provide said corrected signal at the output of said summing means varies substantially linearly with respect to the length of said cable to be equalized.

38. Circuitry as in claim 36 where said signal transmitted over said network is a color television signal.

39. Circuitry as in claim 38 where said one frequency component of the signal transmitted over said network is a color subcarrier upon which color information is encoded.

40. Circuitry as in claim 33 where the color subcarrier frequency is 3.58 MHz.

41. Circuitry as in claim 33 including means for applying a reference signal to said network and means for observing at the output of said summing means an observation signal having a parameter which is related to the magnitude of said component having said one frequency the magnitude of said one frequency whereby said frequency response characteristic of the equalizing circuit means can be modified by the frequency response characteristic modifying means to adjust said parameter of said observation signal to a predetermined level at which time the frequency dependent losses introduced by the network will be compensated for.

42. Circuitry as in claim 41 where said network is a cable, said reference signal is a cable, said reference signal is a predetermined color television signal, said observation signal is the color signal of the predetermined color television signal and said parameter of the observation signal is the magnitude of the color burst signal.

* * * * *